United States Patent [19]
Barnhart et al.

[11] Patent Number: 5,805,836
[45] Date of Patent: Sep. 8, 1998

[54] METHOD AND APPARATUS FOR EQUALIZING GRANTS OF A DATA BUS TO PRIMARY AND SECONDARY DEVICES

[75] Inventors: Steven Russell Barnhart, Austin; Amit Sumanlal Shah, Round Rock; Kenneth Lundy Ward, Austin, all of Tex.

[73] Assignee: International Business Machines Corporation, Armonk, N.Y.

[21] Appl. No.: 762,901

[22] Filed: Dec. 10, 1996

[51] Int. Cl.⁶ .................................................. G06F 13/36
[52] U.S. Cl. .......................... 395/287; 395/728; 395/731
[58] Field of Search .................................. 395/287, 293, 395/294, 728, 730, 731, 732, 729; 340/825.51

[56] References Cited

U.S. PATENT DOCUMENTS

| | | | |
|---|---|---|---|
| 3,983,540 | 9/1976 | Keller et al. | 340/172.5 |
| 4,570,220 | 2/1986 | Tetrick et al. | 364/200 |
| 4,621,202 | 11/1986 | Pumo | 307/241 |
| 4,633,394 | 12/1986 | Georgiori et al. | 395/728 |
| 4,654,820 | 3/1987 | Brahm et al. | 364/900 |
| 4,785,394 | 11/1988 | Fischer | 395/294 |
| 4,924,380 | 5/1990 | McKinney | 395/291 |
| 5,140,691 | 8/1992 | Austruy et al. | 395/575 |
| 5,175,822 | 12/1992 | Dixon et al. | 395/275 |
| 5,392,436 | 2/1995 | Jansen et al. | 395/725 |
| 5,420,989 | 5/1995 | Maher III et al. | 395/375 |
| 5,539,666 | 7/1996 | Kobayashi et al. | 364/514 R |
| 5,555,383 | 9/1996 | Elazar et al. | 395/306 |

FOREIGN PATENT DOCUMENTS

| | | | |
|---|---|---|---|
| 55-53722 | 4/1980 | Japan | G06F 3/00 |
| 96/1815 | 6/1996 | WIPO | G06F 9/46 |

OTHER PUBLICATIONS

*IBM Technical Disclosure Bulletin*, vol. 22, No. 2, Jul. 1979, pp. 656–658, "Processor to Processor Final Communication".

*IBM Technical Disclosure Bulletin*, vol. 33, No. 3B, Aug. 1990, pp. 136–138, "Computer System Bus Protocol Translation Method".

*PCI Local Bus Specification*, Jun. 1, 1995, Revision 2.1, Production Version PCI, Copyright 1992, 1993, 1995 PCI Special Interest Group.

*Primary Examiner*—Gopal C. Ray
*Attorney, Agent, or Firm*—Volel Emile

[57] ABSTRACT

An apparatus for equalizing grants of a primary bus to a plurality of primary devices and secondary devices is provided. The apparatus comprises a primary bus bridge to arbitrate grants of the primary bus among a plurality of primary devices attached to the primary bus and a secondary bus bridge to arbitrate grants of the primary bus among a plurality of secondary devices attached to a secondary bus. A logic device is also provided to equalize grants of the primary bus to the primary and the secondary devices.

12 Claims, 7 Drawing Sheets

PRIOR ART

METHOD AND APPARATUS FOR EQUALIZING GRANTS OF A DATA BUS TO PRIMARY AND SECONDARY DEVICES

BACKGROUND OF THE INVENTION

1. Field of the Invention

The present invention relates generally to the grant of a primary data bus to devices attached to the primary data bus and to devices attached to a secondary data bus and, more particularly, to the equalization of the grants of the data bus to both the devices attached to the primary and secondary data buses.

2. Description of the Related Art

Communication between various computer components, including peripheral devices, typically occurs via a bus. At any given bus cycle, only one device (i.e., a master device) can communicate through the bus. Accordingly, devices wishing to transact data must first request and receive the grant of the bus before proceeding with the transaction.

In conventional systems, a master device does not release the bus until the data transaction is completed. In some instances, however, the master device may be forced to relinquish control of the bus. Such a situation may occur when another device requests bus mastership. If the bus arbiter decides to shift the grant of the bus to the requesting device, it will de-assert the grant from the master device and grant mastership to the requesting device. In this situation, the master device has only one cycle left before it has to release the bus.

Figure 1:
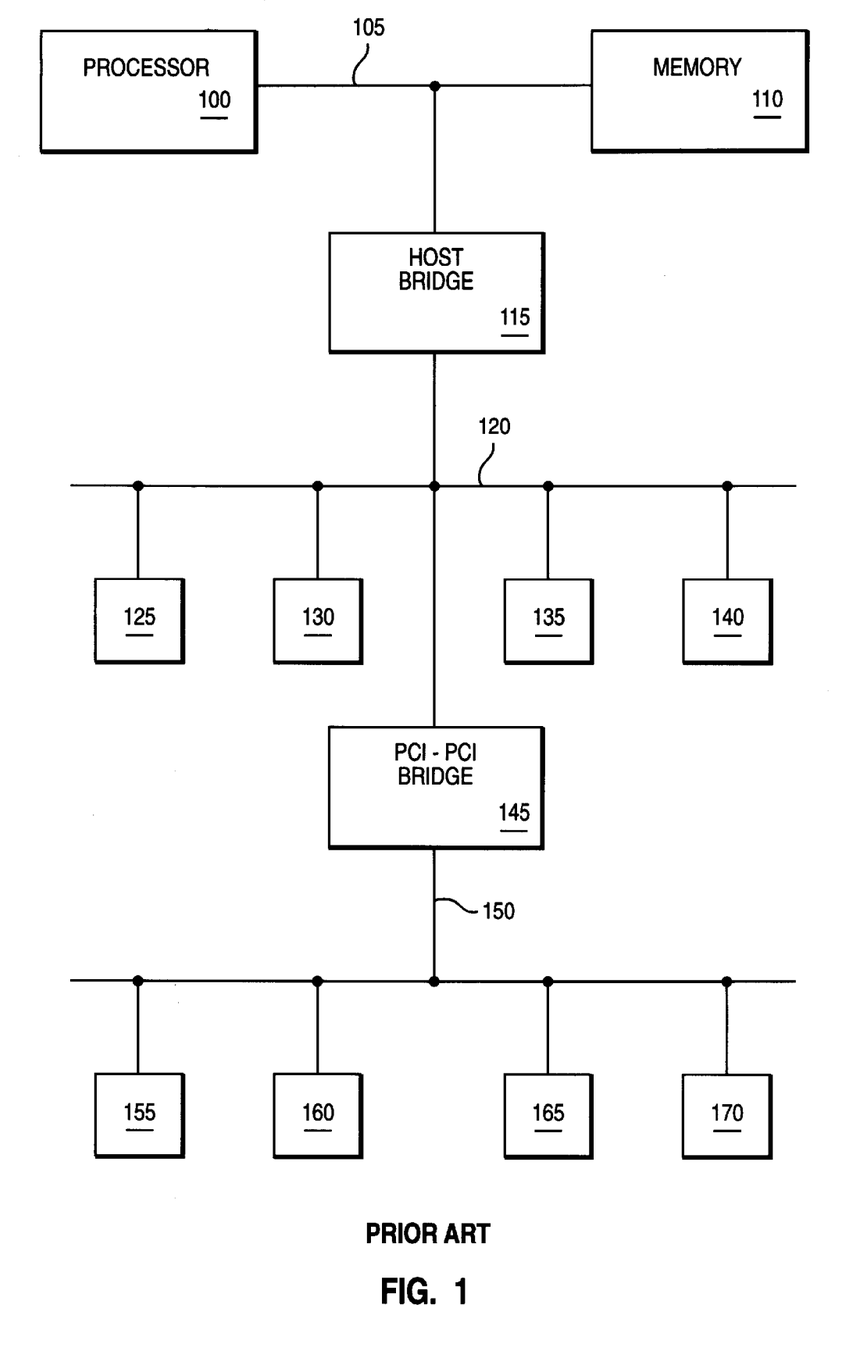
FIG. 1 is a block diagram of a PCI system.

One system that has been developed to enable efficient use of the bus is the peripheral component interconnect (PCI) system. In PCI systems, each device is provided with a latency timer and a predetermined latency value. A detailed explanation of a PCI system can be found in PCI Local Bus Specification, Revision 2.1, PCI Special Interest Group, 1995, which is hereby incorporated. An exemplary PCI system, however, is shown in FIG. 1.

The exemplary PCI system comprises a processor 100 connected to a system memory 110 and a host bridge 115 by a local bus 105. Connected to the host bridge 115 by a primary PCI bus 120 are devices 125, 130, 135, 140 and PCI—PCI bridge 145. The devices 155, 160, 165 and 170 are connected to the PCI—PCI bridge 145 by a secondary PCI bus 150. The devices in the system (i.e., devices 125, 130, 135, 140, 155, 160, 165 and 170) may be any of the following: graphics adapters, communication adapters, network adapters, compact disk, floppy disk, hard disk drives etc.

The host bridge 115 arbitrates the mastership of the bus 120 among the devices 125, 130, 135, 140 and the PCI—PCI bridge 145 in a round robin fashion. Similarly, the PCI—PCI bridge 145 arbitrates the mastership of the bus 150 among the devices 155, 160, 165 and 170 in a round robin fashion. For example, suppose mastership of the primary bus 120 is granted in a counterclockwise order and suppose device 140 is the current master device, if both PCI—PCI bridge 145 and device 125 request mastership of the primary bus 120 simultaneously, device 125 will be granted the bus 120 before it is granted to PCI—PCI bridge 145. The PCI—PCI bridge 145 requests the mastership of the primary bus 120 whenever one of the devices 155, 160, 165 and 170 wishes to transact data with a device on the primary bus 120 or with either the processor 100 or the system memory 110.

As alluded to before, each of the PCI devices, including the PCI—PCI bridge 145, has a latency timer that dictates when the device has to relinquish the bus' mastership regardless of whether data transmission has been completed. Of course, if data transmission is completed before the latency time has elapsed, the device will relinquish the mastership of the bus at that time. In any event, when mastership of the bus is relinquished by the master device, the next requesting device in the arbitration scheme is granted the bus and thus becomes the new master device. If all the devices in the system are continually requesting the mastership of the primary bus 120 (worst case scenario), the devices on the bus 120 will obtain the bus' mastership every n arbitration cycles, n being the number of devices, including the PCI—PCI bridge 145, attached to the bus 120. The devices on the secondary bus 150, however, only have the mastership of the bus 120 each time the PCI—PCI bridge 145 is granted the bus by the host bridge 115. That is, every time the PCI—PCI bridge 145 obtains mastership of the bus it allows a different one of the devices 155, 160, 165 and 170 to gain possession of the bus 120. Consequently, the devices on the secondary bus 150 will have ownership of the primary bus 120 every (n×m) arbitration cycles, where m is the number of devices on the secondary bus 150.

Some devices, such as communication adapters, have fixed latency requirements. That is, the devices have a buffer that temporarily holds a fixed amount of data until the device is granted the bus. If the latency requirement is exceeded (i.e., if the buffer is filled up before the devices are actually granted the bus), an overrun error may occur (i.e., new data may be copied over existing data in the buffer). This error is more likely to occur in devices attached to the secondary bus 150 since they are granted the primary bus 120 every (n×m) arbitration cycles. To recover from this error, the devices have to request the device from which the data in the buffer was received to retransmit the data. In addition, if the devices were forced to relinquish the primary bus 120 in the middle of a data transaction, they may have to start anew the transmission cycle. This, therefore, adversely impacts the performance of the system.

Furthermore, as has already been stated, the devices on the primary bus 120 gain possession of the bus more frequently than the devices on the bus 150. Accordingly, throughputs of the devices on the secondary bus 150 are significantly less than those of the devices on the primary bus 120. (A throughput is the amount of data transferred within a certain amount of time.)

Thus, there is a need in the art for an apparatus and method to equalize ownership of the primary bus 120 between devices on the primary bus 120 and devices on the secondary bus 150.

SUMMARY OF THE INVENTION

The need in the art is addressed by the present invention. The present invention provides a method and apparatus for equalizing grants of a primary bus to a plurality of primary devices and secondary devices. The apparatus comprises a primary bus bridge to arbitrate grants of the primary bus among a plurality of primary devices attached to the primary bus and a secondary bus bridge to arbitrate grants of the primary bus among a plurality of secondary devices attached to a secondary bus. A logic device is provided to equalize the grants of the primary bus to the primary and the secondary devices.

DESCRIPTION OF THE INVENTION

Figure 2:
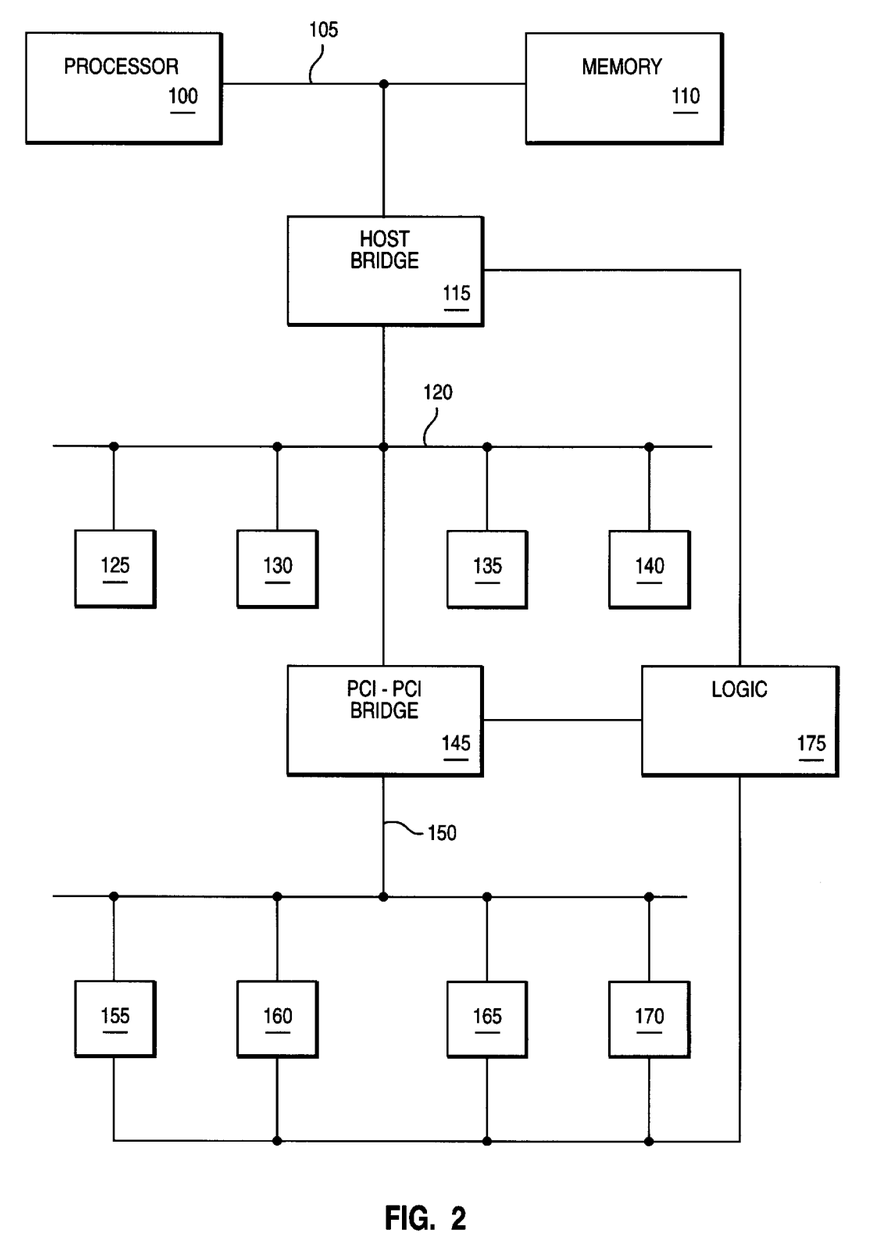
FIG. 2 is a block diagram of a computer system incorporating the present invention.

FIG. 2 is a block diagram of a computer system incorporating the present invention. Such computer may take the form of a workstation such as the RS/6000 systems marketed by the IBM Corporation, although the invention is not intended to be so limited and is equally applicable to, essentially any computer system.

Nonetheless, FIG. 2 comprises FIG. 1 with a logic 175. The logic 175 is connected to each of the devices on the secondary bus 150 as well as to the PCI—PCI bridge 145 and the host bridge 115. The logic 175 is used to ensure that once the PCI—PCI bridge 145 is granted mastership of the primary bus 120, it retains control of the bus until all requesting devices on the secondary bus 150 are serviced. This, therefore, guarantees that the devices on the buses 120 and 150 will have access to the bus 120 every (n+m−1) arbitration cycles rather than n arbitration cycles for the devices on the primary bus 120 and (n×m) arbitration cycles for those on the secondary bus 150.

Figure 3:
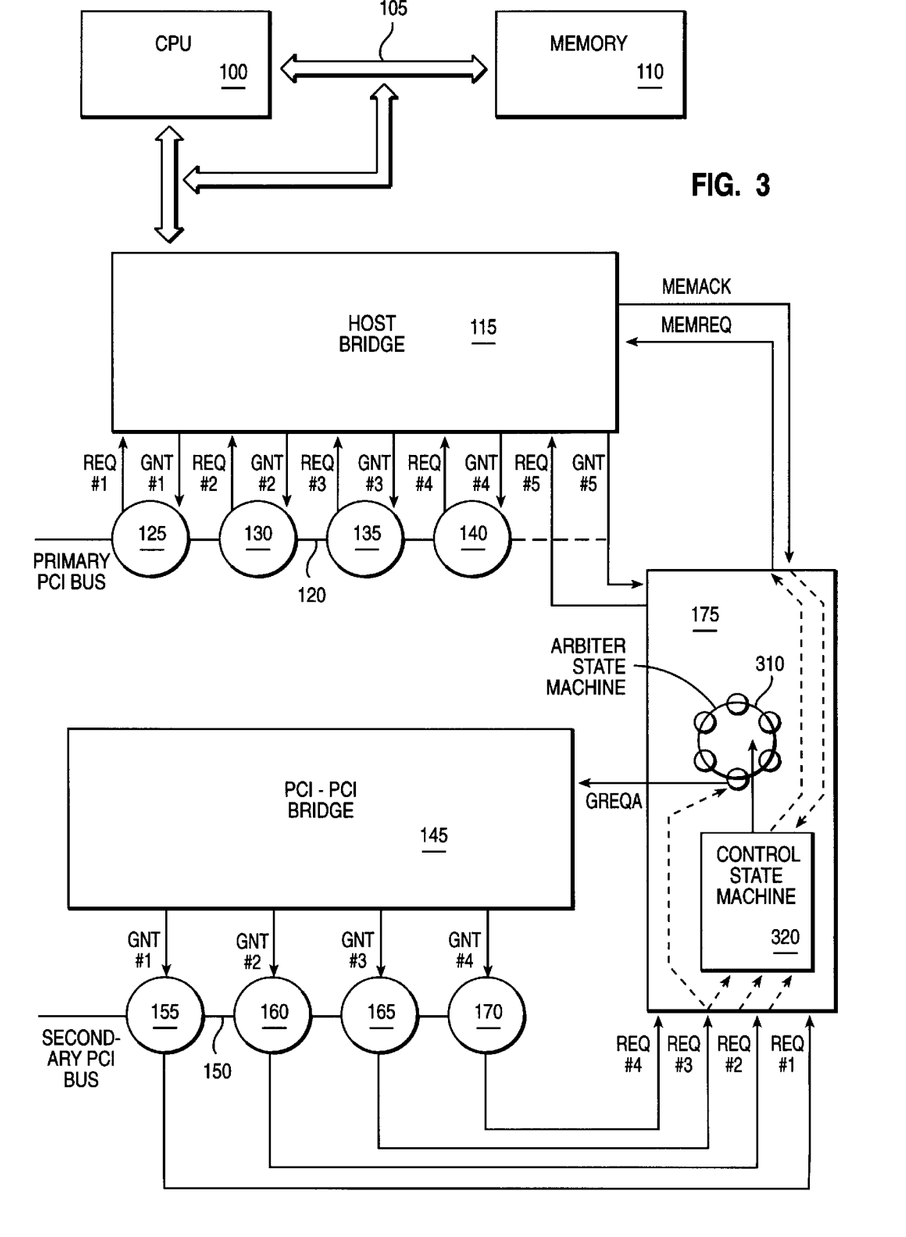
FIG. 3 is a more detailed block diagram of the computer system incorporating the invention.

FIG. 3 is a more detailed block diagram of the computer system incorporating the invention. In this figure, the logic 175 is shown comprising an arbiter state machine 310 and a control state machine 320 connected to each other. The arbiter state machine 310 is also connected to the PCI—PCI bridge 145 by gated request lines corresponding to each of the devices attached to the secondary bus 150. The control state machine 320 is connected to request lines of the devices 155, 160, 165 and 170. The control state machine 320 is also connected to the host bridge 115 by a memory acknowledge (memack) line and a memory request (memreq) line. The memreq line is asserted to request that the processor 100 be blocked from accessing the primary bus 120. The host bridge asserts memack once the processor 100 has been barred from accessing the bus 120.

The devices 125, 130, 135, 140 and the logic 175 each are connected to the host bridge 115 by a request line and grant line. As is fully disclosed later, the control state machine 320 is used to secure the grant of the bus 120 and the arbiter state machine 310 is used to control the bus request of the requesting devices on the secondary bus 150.

Figure 4:
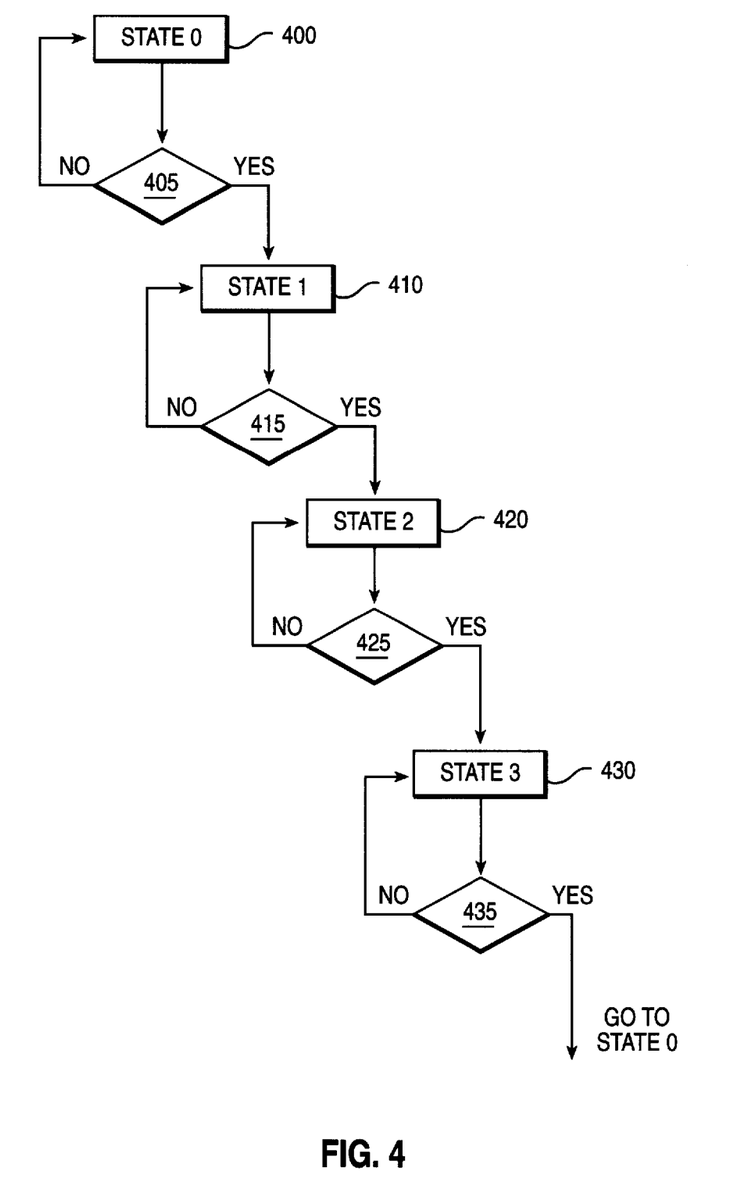
FIG. 4 is a state diagram of a control state machine used in the invention.

FIG. 4 is a state diagram of the control state machine 320. In step 400, the control state machine 320 is in idle state or state 0. This signifies that both the memreq and req (shown as req5) signals to the host bridge 115 of FIG. 3 are de-asserted. In step 405, it is determined whether any one of the devices 155, 160, 165 and 170 has made a request for the primary bus 120. If no, the control state machine 320 remains in the idle state and the process returns to step 400. If yes, the control state machine 320 moves to state 1 by asserting the memreq signal. In step 415, it is determined whether the host bridge 115 has sent a memack signal to the control state machine 320 in response to the memreq signal. If no, the control state machine does not move to state 2 and the process returns to step 410. If yes, the control state machine 320 moves to state 2 by asserting the req5 signal (step 420). In step 425, it is determined whether the host bridge 115 has granted the bus 120 to the control state machine 320 by asserting gnt5. If no, the control state machine remains in state 2. If yes, the control state machine 320 transitions to state 3. In state 3, the control state machine 320 notifies the arbiter state machine 310 that it has ownership of the primary bus 120. Upon notification, the arbiter state machine 310 forwards a gated-reqx (greqx), where x corresponds to the requesting device that will be granted the use of the bus 120. When granted the bus, the device completes its data transaction. In step 435, it is determined whether the arbiter state machine 310 has completed its full arbitration circle. If not, the control state machine 320 stays in state 3. The control state machine will remain in state 3 until the arbiter state machine 310 has returned to its idle state. Once this occurs, the control state machine 320 returns to idle or state 0 and de-asserts the memreq and req5 signals.

Figure 5:
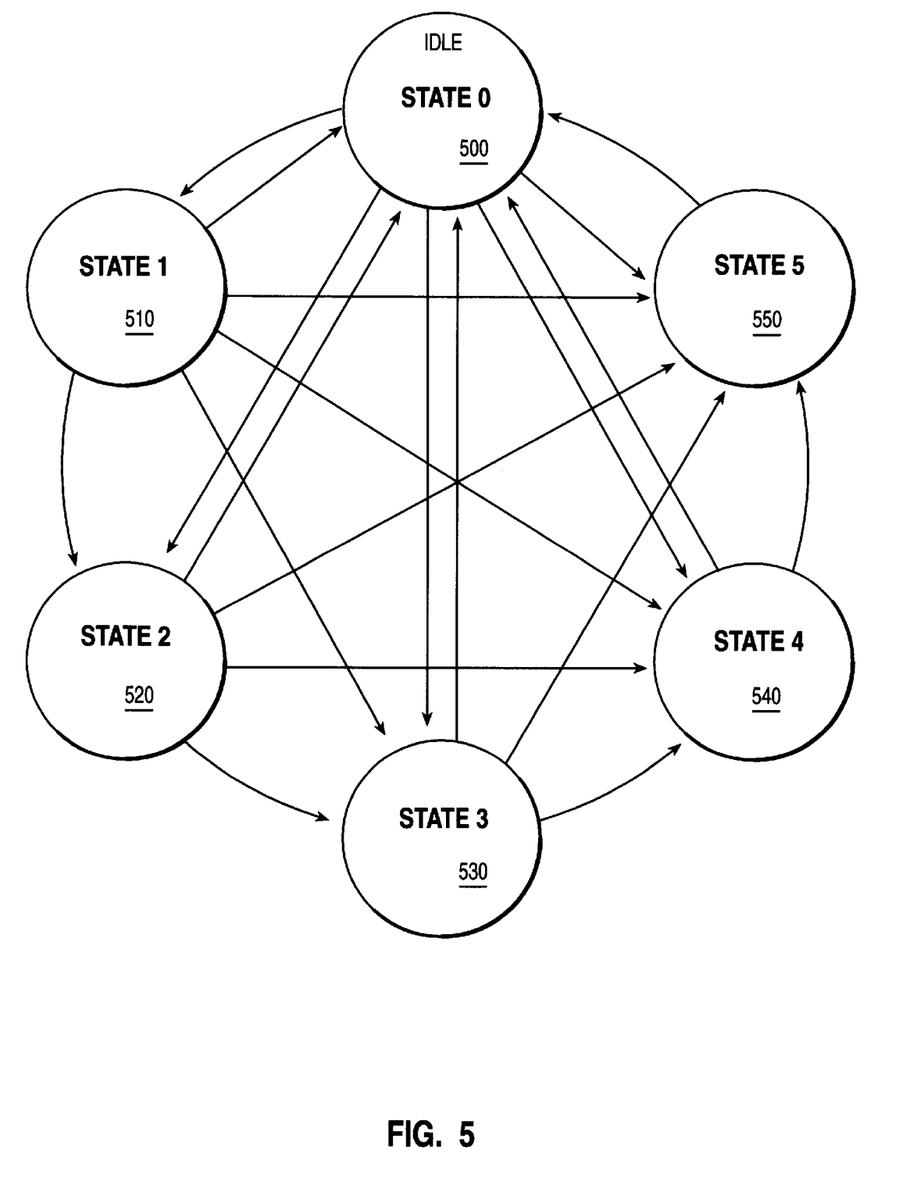
FIG. 5 is a state diagram of an arbiter state machine used in the invention.

FIG. 5 is a state diagram of the arbiter state machine 310. In state 0, the arbiter state machine 310 is in idle state. States 1, 2, 3 and 4 correspond to granting the bus to devices 155, 160, 165 and 170, respectively. State 5 may be used for servicing an additional bridge in the system. The bridge may be another PCI bridge, an industry standard architecture (ISA) bridge, an extended industry standard architecture (EISA) bridge or a Micro Channel bridge (Micro Channel is a trademark of International Business Machines Corporation).

As is illustrated, the arbiter state machine 310 works in a counterclockwise fashion. The arbiter state machine 310, however, will only step through all the states if all the devices have requested the use of the bus. Note that each state corresponds to servicing a device. For example, suppose devices 170, 160 and 165, in that order, request the use of the bus 120. Upon notification that the control state machine 320 has been granted the bus, the arbiter state machine 310 will go from step 500, state 0, to step 520, state 2. In state 2, the arbiter state machine 310 will send a gated-request-to-device2, greq2, signal to the PCI—PCI bridge 145. The PCI—PCI bridge 145 then grants the bus to device 2 (i.e., device 160). While in state 2, if device 155 expresses its desire to use the bus 120, it will not be allowed to do so until the next primary bus arbitration cycle since the arbiter state machine 310 can only move to state 1 from state 2 by going through state 0. After the data transaction cycle is terminated, the arbiter state machine 310 will move to state 3, step 530, in order to service device 165, then to state 4 to service device 170. After state 4, the arbiter state machine 310 will move to state 0, step 500. The arbiter state machine 310 will remain in state 0 until the control state machine 320 has itself returned to its idle state. This, therefore, prevents the arbiter state machine 310 from servicing the devices on the secondary bus 150 more than once per each primary arbitration bus cycle.

In operation, when a device on the secondary bus 150 wishes to use the primary bus 120, it sends a request to the control state machine 320 in the logic 175. As a result, the control state machine 320 sends memreq to the host bridge 115. When the host bridge 115 has blocked the processor 100 from accessing the primary bus 120, it sends memack to the control state machine 320. At that point, the logic 175 requests access to the primary bus 120 by asserting its request signal (req5) connected to the host bridge 115. When the host bridge 115 determines that it is the logic 175's turn to have access to the primary bus 120, it grants the bus by asserting the grant signal (gnt5) connected to the logic 175. Once the control state machine 320 detects the grant signal, it notifies the arbiter state machine 310 that it now has ownership of the primary bus 120. The arbiter state machine 310 then forwards the appropriate arbitration request level to the PCI—PCI bridge 145. The PCI—PCI bridge 145 then grants the bus 120 to the proper device.

As explained earlier, while the logic 175 has ownership of the bus 120, all requesting devices attached to the bus 150 will have an opportunity to access the bus. After granting each requesting device the use of the bus, the logic 175 relinquishes the ownership of the bus.

There may be instances when an additional bridge is attached to the primary bus 120. For example in FIG. 6, device 180 is an ISA bridge and presumably has an ISA bus to which ISA devices are attached (not shown). When the ISA bridge wishes to have ownership of the primary bus 120, it indicates its desire to do so by sending an ISA bridge request 185 to the logic 175. When the logic 175 obtains ownership of the bus and has granted all the requesting devices attached to the secondary PCI bus 150 the use of the bus, it will pass the bus' mastership to the ISA bridge 180.

Figure 7:
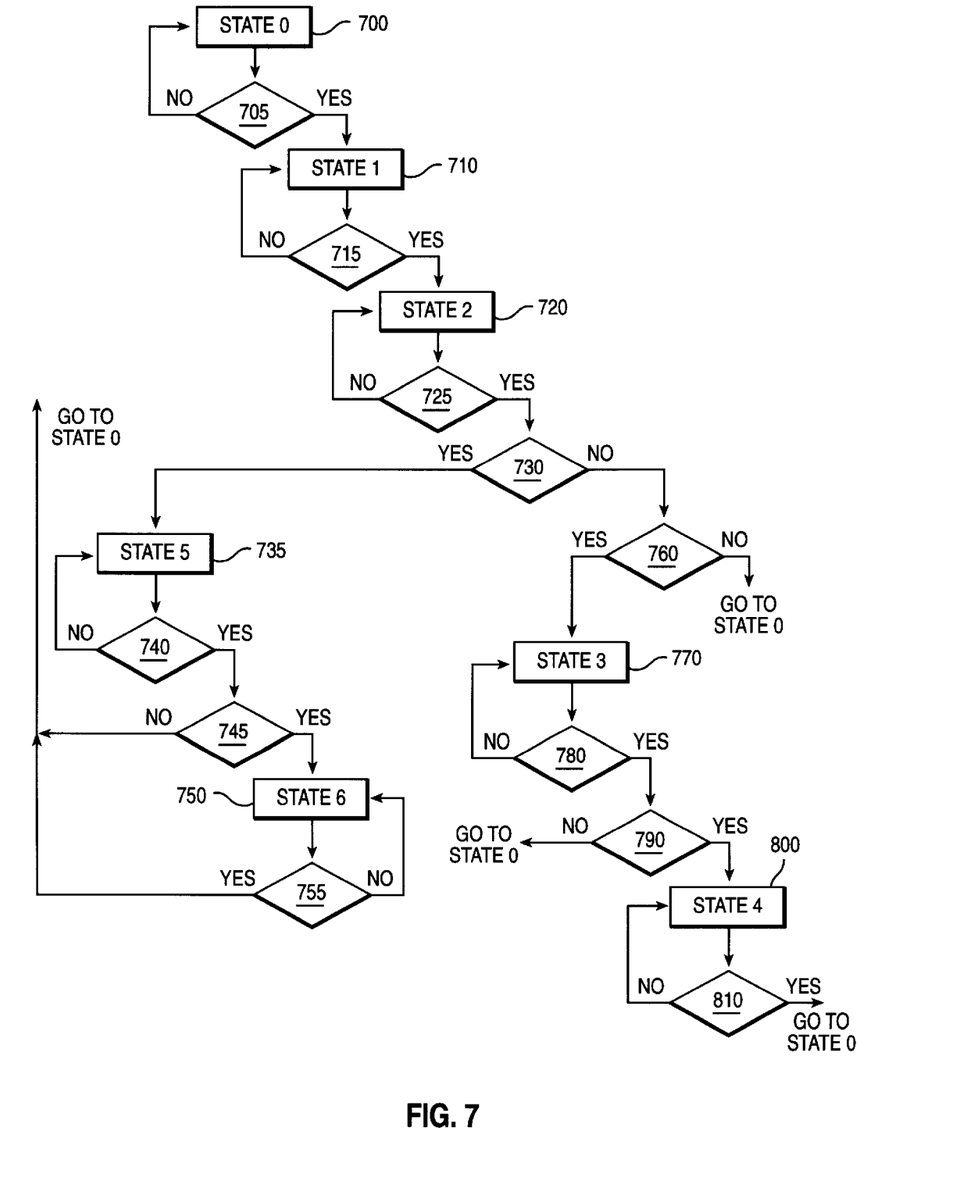
FIG. 7 is a flow diagram of the states of the control state machine when servicing both the PCI bridge and the ISA bridge.

FIG. 7 is a flow diagram of the states of the control state machine 320 when servicing both the PCI—PCI bridge 145 and the ISA bridge 180. In step 700, the control state machine 320 is in idle state or state 0. In step 705, it is determined whether any one of the devices 155, 160, 165 and 170 or the ISA bridge 180 has made a request for the primary bus 120. If no, the control state machine 320 remains in the idle state and the process returns to step 700. If yes, the control state machine moves to state 1 by asserting the memreq signal (step 710). In step 715, it is determined whether the host bridge has sent a memack signal to the control state machine 320. If no, the control state machine 320 does not move to state 2 and the process returns to step 710. If yes, the control state machine 320 moves to state 2 by asserting the req5 signal (step 720). In step 725, it is determined whether the host bridge has granted the bus to the control state machine 320 by asserting gnt5. If no, the control state machine remains in state 2. If yes, then in step 730, it is determined if any of the devices on the secondary bus 150 requested the primary bus 120. If yes, the control state machine moves to state 5 (step 735). If no, then the control state machine 320 must have been taken off its idle state by the ISA bridge 180.

In state 5, the control state machine 320 notifies the arbiter state machine 310 that it has ownership of the primary bus 120. In step 740 it is determined whether the arbiter state machine 310 has completed its full arbitration circle. If no, the control state machine 320 stays in state 5. If yes, a determination is made as to whether the ISA bridge 180 has an active request line (step 745). If no, the control state machine 320 returns to its idle state. If yes, the control state machine 320 moves to state 6, step 750, by granting the bus 120 to the ISA bridge 180. In step 755, it is determined whether the ISA request has been removed. If no, the control state machine 320 remains in state 6. If yes, the control state machine 320 returns to its idle state.

If in step 730, it is determined that no devices on the secondary bus 150 requested the grant of the primary bus 120, then a determination is made as to whether the ISA bridge 180 made the request for the primary bus 120 (step 760). If no, the control state machine 320 returns to idle. If yes, the control state machine 320 transitions to state 3 (step 770). In state 3, the control state machine 320 grants the bus 120 to the ISA bridge 180. The control state machine 320 will remain in state 3 until the ISA request has been de-asserted (step 780). When the ISA request is de-asserted, a determination is made as to whether any of the devices attached to the secondary PCI bus 150 has made a request for the primary PCI bus 120 (step 790). If no, the control state machine returns to its idle state. If yes, the control state machine 320 goes to state 4 (step 800). State 4 is equivalent to state 5 discussed in the previous paragraph. The control state machine remains in state 4 until the arbiter state machine 310 reaches its idle state. Once that occurs, the control state machine returns to its idle state (step 810).

Figure 6:
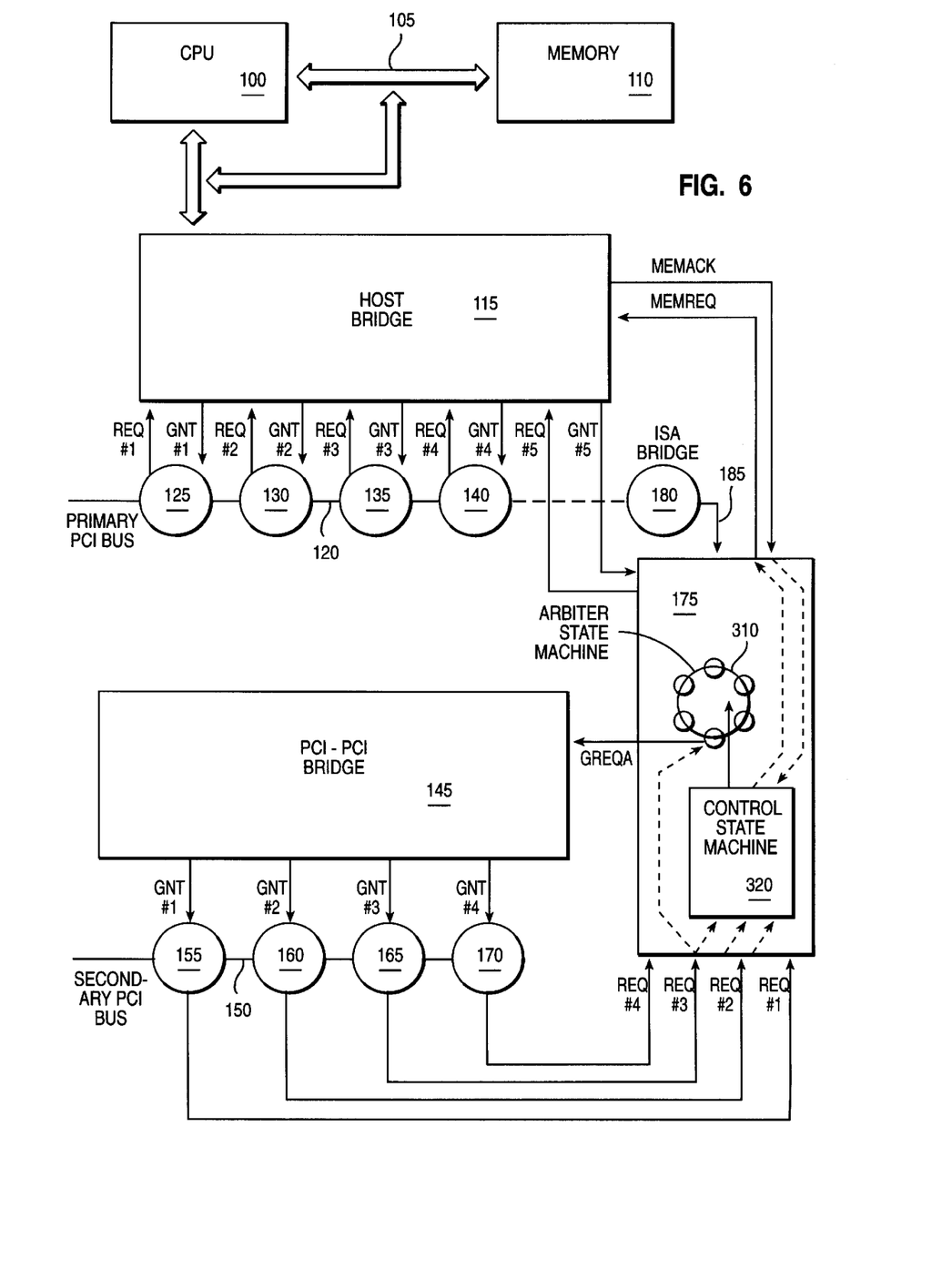
FIG. 6 is a detailed block diagram of the computer system wherein the invention is servicing a PCI bridge as well as an ISA bridge.

In sum, if while the devices on the secondary bus 150 are being serviced, the ISA bridge 180 issues a request for the primary bus 120, the logic 175 will service the ISA bridge 180 before relinquishing ownership of the bus 120. Similarly, if while the ISA bridge 180 is being serviced, one or all of the devices attached to the secondary bus 150 request the grant of the bus 120, the logic 175 will service the devices before relinquishing ownership of the bus 120. In the above situations, the system incurs the overhead (i.e., asserting memack, waiting for memreq, checking for req5 and gnt5, etc.) associated with appropriating the bus 120 by the logic 175 only once. Hence, the system's performance is greatly enhanced.

Although the present invention has been fully described above with reference to specific embodiments, other alternative embodiments will be apparent to those of ordinary skill in the art. For example, the arbiter state machine 310 may not have to service the devices in a counterclockwise fashion. A coded data stored in a register may be used to keep track of each device serviced during each current primary bus arbitration cycle. For instance, the first bit of the coded data may correspond to the first device, the second bit to the second device and so on. Before servicing any of the devices, all the bits of the coded data may be initialized to zero. When a device is serviced, the bit corresponding to that device may then be set to 1. This, therefore, will allow the devices to send in their request for the bus 120 in any order and to still be given the use of the bus 120 during the current primary bus arbitration cycle so long as the logic 175 has control of the bus. After all the requesting devices have been serviced once during a current primary bus arbitration cycle, the arbiter state machine 310 may then return to its idle state.

Therefore, the above description should not be taken as limiting the scope of the present invention which is defined by the appended claims.

What is claimed is:

1. An apparatus for equalizing grants of a bus to a plurality of primary devices and to a plurality of secondary devices comprising:

first means for arbitrating first grants of said bus among said primary devices, said primary devices being attached to said first means;

second means for arbitrating second grants of said bus among said secondary devices, said secondary devices being attached to said second means; and means, connected to said first and second means, for equalizing said first and said second grants.

2. The apparatus of claim 1 wherein said equalizing means includes:

control means for requesting and receiving mastership of said bus from said first arbitrating means; and means for granting said bus to said secondary devices.

3. The apparatus of claim 2 wherein all secondary devices wishing to use said bus are granted said bus before mastership of said bus is returned to said first arbitrating means.

4. The apparatus of claim 3 wherein before requesting mastership of said bus, said control means requests and receives verification that processor accesses to said bus are barred.

5. The apparatus of claim 4 wherein said granting means includes means for requesting that said second arbitrating means grant said bus in turn to each requesting device.

6. The apparatus of claim 5 further comprising a third arbitrating means for arbitrating third grants of said bus among a plurality of tertiary devices, said third arbitrating means requesting a grant of said bus from said equalizing means.

7. A method of equalizing grants of a bus to a plurality of primary devices and to a plurality of secondary devices, said method comprising the steps of:

arbitrating first grants of said bus among said primary devices;

arbitrating second grants of said bus among said secondary devices; and equalizing said first and said second grants.

8. The method of claim 7 wherein said equalizing step includes the steps of:

requesting and receiving mastership of said bus; and granting said bus to said secondary devices.

9. The method of claim 8 further comprising the step of granting said bus to all secondary devices wishing to use said bus before mastership of said bus is returned to said first arbitrating means.

10. The method of claim 9 comprising the step of requesting and receiving verification that processor accesses to said bus are barred before said step of requesting and receiving.

11. The method of claim 10 wherein said step of granting includes the step of granting said bus in turn to each requesting device.

12. The method of claim 11 further comprising the step of arbitrating third grants of said bus among a plurality of tertiary devices, said step of arbitrating said third grants includes the step of requesting a grant of said bus.

* * * * *